US012053074B2

(12) United States Patent
Kim et al.

(10) Patent No.: US 12,053,074 B2
(45) Date of Patent: Aug. 6, 2024

(54) DOUBLE CONTAINER

(71) Applicant: Yonwoo Co., Ltd., Incheon (KR)

(72) Inventors: Yu Seob Kim, Incheon (KR); Hyo Sun Jung, Incheon (KR)

(73) Assignee: YONWOO CO., LTD., Incheon (KR)

( * ) Notice: Subject to any disclaimer, the term of this patent is extended or adjusted under 35 U.S.C. 154(b) by 123 days.

(21) Appl. No.: 17/787,436

(22) PCT Filed: Sep. 24, 2020

(86) PCT No.: PCT/KR2020/012982
§ 371 (c)(1),
(2) Date: Jun. 20, 2022

(87) PCT Pub. No.: WO2021/125513
PCT Pub. Date: Jun. 24, 2021

(65) Prior Publication Data

US 2023/0013434 A1 Jan. 19, 2023

(30) Foreign Application Priority Data

Dec. 19, 2019 (KR) ........................ 10-2019-0171209

(51) Int. Cl.
*A45D 34/04* (2006.01)
*B05B 11/00* (2023.01)
*B05B 11/10* (2023.01)

(52) U.S. Cl.
CPC .......... *A45D 34/04* (2013.01); *B05B 11/0013* (2013.01); *B05B 11/0038* (2018.08); *B05B 11/0097* (2013.01); *B05B 11/1047* (2023.01)

(58) Field of Classification Search
CPC ............. B05B 11/0038; B05B 11/0013; B05B 11/0097; B05B 11/1047; B05B 11/0032;
(Continued)

(56) References Cited

U.S. PATENT DOCUMENTS 4,061,247 A * 12/1977 Meshberg ........... B05B 11/1092
222/321.2
4,311,255 A * 1/1982 Meshberg ........... B05B 11/0037
215/205
(Continued)

FOREIGN PATENT DOCUMENTS

JP 2008-296940 A 12/2008
KR 20-0421315 Y1 7/2006
(Continued)

*Primary Examiner* — Kareen K Thomas
(74) *Attorney, Agent, or Firm* — Bridgeway IP Law Group, PLLC; Sang Ho Lee; Hyun Woo Shin

(57) ABSTRACT

A double container includes: a nozzle for discharging a content through a discharge hole under pressurization of a user; a pump assembly for discharging the content under the pressurization of the nozzle; an inner container having a first accommodation portion adapted to accommodate the content therein and a first edge portion formed on top of the first accommodation portion to accommodatedly seat at least a portion of the pump assembly thereonto; an outer container having a second accommodation portion adapted to accommodate the inner container therein and a second edge portion formed on top of the second accommodation portion; and a shoulder detachably coupled to the second edge portion of the outer container and adapted to pressurize the inner container through the coupling to the outer container to allow the inner container to come into close contact with the outer container, wherein the outer container may be made of glass.

7 Claims, 8 Drawing Sheets

(58) Field of Classification Search
CPC ............... B05B 11/028; B05B 11/1023; B05B 11/1069; B05B 11/1074; B05B 11/0054; A45D 2200/051; A45D 2200/053; A45D 2200/056; A45D 40/26; A45D 34/04; A45D 2034/007; A45D 2040/0012; B65D 53/02; B65D 77/0493; B65D 83/0005
See application file for complete search history.

(56) References Cited

U.S. PATENT DOCUMENTS

| | | | | |
|---|---|---|---|---|
| 2011/0272410 | A1* | 11/2011 | Sato | B05B 11/0054 220/500 |
| 2020/0047966 | A1* | 2/2020 | Yamauchi | B65D 77/06 |
| 2020/0179620 | A1* | 6/2020 | Wuttke | B05B 11/1091 |
| 2021/0228822 | A1* | 7/2021 | Dunne | A61K 9/0078 |

FOREIGN PATENT DOCUMENTS

| | | | |
|---|---|---|---|
| KR | 10-1021611 | A | 3/2011 |
| KR | 10-1422069 | B1 | 7/2014 |
| KR | 10-1900419 | B1 | 9/2018 |

* cited by examiner

DOUBLE CONTAINER

TECHNICAL FIELD

The present invention relates to a double container, and more specifically, to a double container that is capable of allowing an outer container made of glass and an inner container to be stably coupled to each other and exchanging the inner container and a pump assembly unitarily with new ones.

BACKGROUND ART

Conventional cosmetic containers are configured to discharge a content accommodated therein in fixed quantities to the outside through a discharge member such as an airless pump, and while the content in the cosmetic container is being not used, the cosmetic containers serve to prevent air or foreign matters from being introduced thereinto from the outside to thus avoid the content from being changed in quality so that the content can be stored for a long time.

However, the conventional cosmetic containers are uniform in structure and outer appearance, thereby making it hard to obtain product differentiation.

So as to solve such a problem, accordingly, double containers each having an outer container and an inner container have been proposed. In specific, the double container is configured to allow a cosmetic liquid to be stored in the inner container and to provide a final outer appearance thereof through the outer container.

The conventional double containers are configured to allow the inner container to be inserted into the outer container so that the inner container and the outer container are coupled to each other by means of the pressurization of a cap. In this case, however, it is hard to firmly couple the inner container to the outer container, and if an external force is applied, further, the movements or disarrangements of the inner container may happen frequently.

Accordingly, there is a need to develop a technology capable of solving such problems.

DISCLOSURE

Technical Problem

Accordingly, the present invention has been made in view of the above-mentioned problems occurring in the related art, and it is an object of the present invention to provide a double container that is capable of allowing an outer container made of glass and an inner container to be stably coupled to each other and exchanging the inner container and a pump assembly unitarily with new ones.

The technical problems to be achieved through the present invention are not limited as mentioned above, and other technical problems not mentioned herein will be obviously understood by one of ordinary skill in the art through the following description.

Technical Solution

According to an embodiment of the present invention, there is provided a double container. The double container may include: a nozzle for discharging a content through a discharge hole under the pressurization of a user; a pump assembly for discharging the content under the pressurization of the nozzle; an inner container having a first accommodation portion adapted to accommodate the content therein and a first edge portion formed on top of the first accommodation portion to accommodatedly seat at least a portion of the pump assembly thereonto; an outer container having a second accommodation portion adapted to accommodate the inner container therein and a second edge portion formed on top of the second accommodation portion; and a shoulder detachably coupled to the second edge portion of the outer container and adapted to pressurize the inner container through the coupling to the outer container to allow the inner container to come into close contact with the outer container, wherein the outer container may be made of glass.

Desirably, in a state where the shoulder may be separated from the second edge portion of the outer container, the nozzle, the pump assembly, and the inner container may be unitarily separable from the outer container.

Further, desirably, the shoulder may include a side peripheral wall coupled to the outer peripheral surface of the second edge portion of the outer container, a top wall bent inwardly from the top end periphery of the side peripheral wall, and a pressurizing edge extending downwardly from the inner end periphery of the top wall to downwardly pressurize the inner container.

Further, desirably, the pressurizing edge may include a through hole formed at the inside thereof to pass the pump assembly therethrough, and the inner peripheral surface of the pressurizing edge may come into close contact with the outer peripheral surface of the pump assembly.

Also, desirably, the inner container may further include a seating edge portion protruding outwardly from the outer peripheral surface of top of the first accommodation portion, and if the inner container is coupled to the outer container, the seating edge portion may be seated onto top of the second edge portion of the outer container.

Moreover, desirably, the seating edge portion may have at least one or more rotation prevention protrusions protruding from the underside thereof, and the second edge portion of the outer container has at least one or more rotation prevention grooves formed on the inner peripheral surface thereof to insert the rotation prevention protrusions thereinto so that the inner container is prevented from rotating.

Further, desirably, the protruding heights of the rotation prevention protrusions may be greater than the depths of the rotation prevention grooves to cause at least a portion of the underside of the seating edge portion to be spaced apart from top of the second edge portion by a given distance so that through the space, a first communication portion for air communication with the second accommodation portion may be formed.

Also, desirably, a plurality of rotation prevention protrusions may be inserted into the at least one or more rotation prevention grooves, respectively, and at least portions of the plurality of rotation prevention protrusions inserted into the corresponding rotation prevention groove may be spaced apart from each other to thus form a second communication portion for air communication with the second accommodation portion.

Moreover, desirably, the inner container may have a disc disposed inside the first accommodation portion so that as the content is discharged, the disc moves up.

Advantageous Effects of the Invention

According to the present invention, the double container is configured to have the inner container and the outer container, and in this case, the outer container is made of glass, thereby providing luxurious outer appearance.

According to the present invention, further, if the inner container is seated onto the outer container, first coupling between the seating edge portion and the rotation prevention protrusions of the inner container and the second edge portion and the rotation prevention grooves of the outer container is preformed, and next, second coupling between the inner container and the outer container is performed through the shoulder, thereby providing a more firm double coupling structure.

According to the present invention, moreover, the air communication structure is provided to perform the air communication between the outer container and/or the inner container, and accordingly, the inner container is contracted or the disc moves up gently in accordance with the discharge of the content, so that the content can be all consumed, without having any malfunction of the pump.

According to the present invention, in addition, the inner container, the pump assembly, and the nozzle are unitarily exchanged with new ones after the shoulder has been separated, so that the double container can be refilled with a new content in a simple and easy manner, thereby increasing conveniences of the user.

DESCRIPTION OF DRAWINGS

To allow the drawings as will be mentioned in the description of the present invention to be more sufficiently understood, the brief description of the drawings may be provided.

MODE FOR INVENTION

Figure 1:
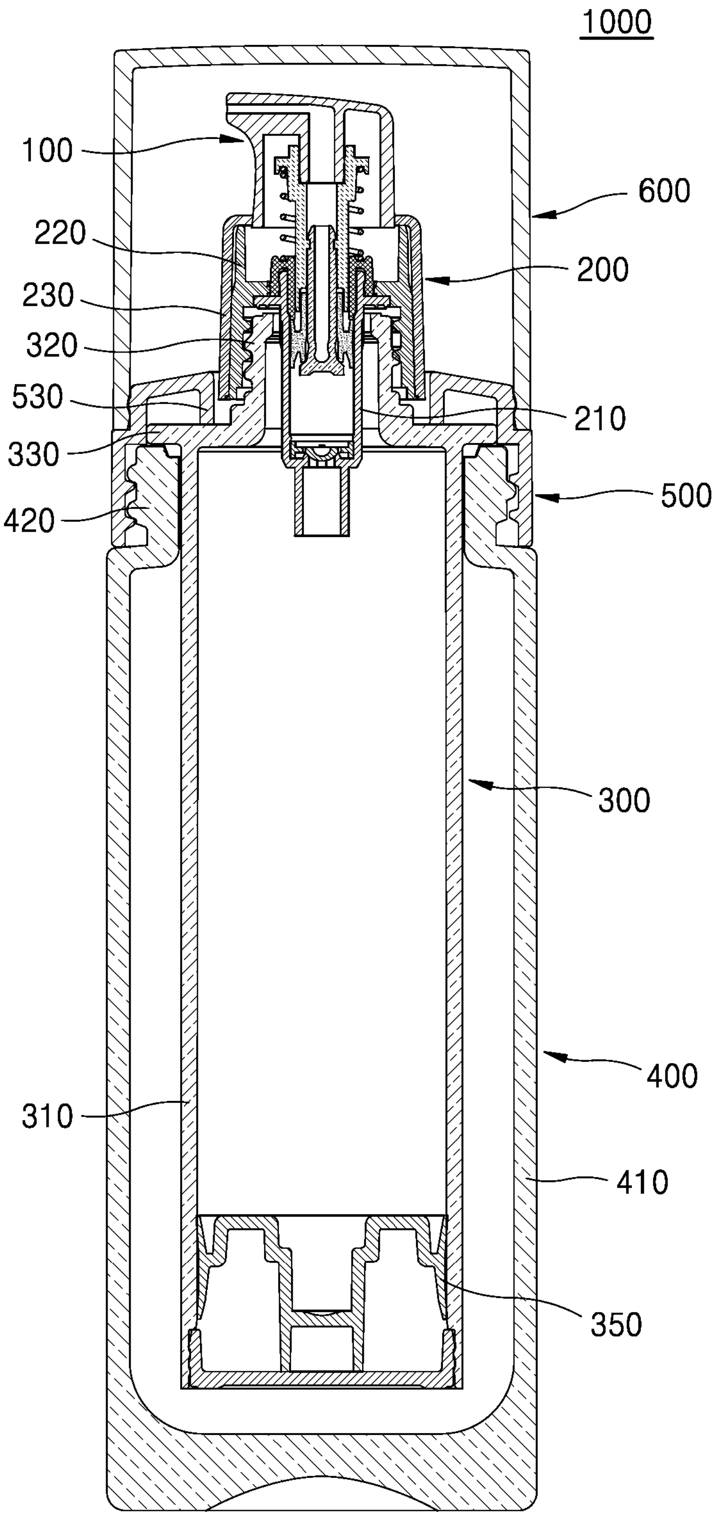
FIG. 1 is a sectional view showing a double container according to an embodiment of the present invention.

Hereinafter, example embodiments will be described with reference to the accompanying drawings; however, for reference numerals, with respect to the same elements, even though they may be displayed in different drawings, such elements use same reference numerals as much as possible. Also, in explaining the example embodiments, detailed description on known elements or functions will be omitted if it is determined that such description will interfere with understanding of the embodiments. In addition, the example embodiments may be embodied in different forms and should not be construed as limited to the embodiments set forth herein but may be modified and variously implemented by those skilled in the art. Further, top, bottom, left and right directions as will be described below are determined with reference to the drawings, and accordingly, the scope of the present invention is not necessarily restricted to the corresponding directions.

In the description, when it is said that one element is described as being "connected" to the other element, one element may be directly connected or coupled to the other element, but it should be understood that another element may be present between the two elements. When it is said that one portion is described as "includes" any component, further, one element may further include other components unless no specific description is suggested. Also, in explaining elements, terms like "first", "second", "A", "B", "(a)", "(b)", etc. may be used. However, such terms are used to distinguish one from the others only and they do not affect the essence, nature, sequence, order, etc.

Figure 2:
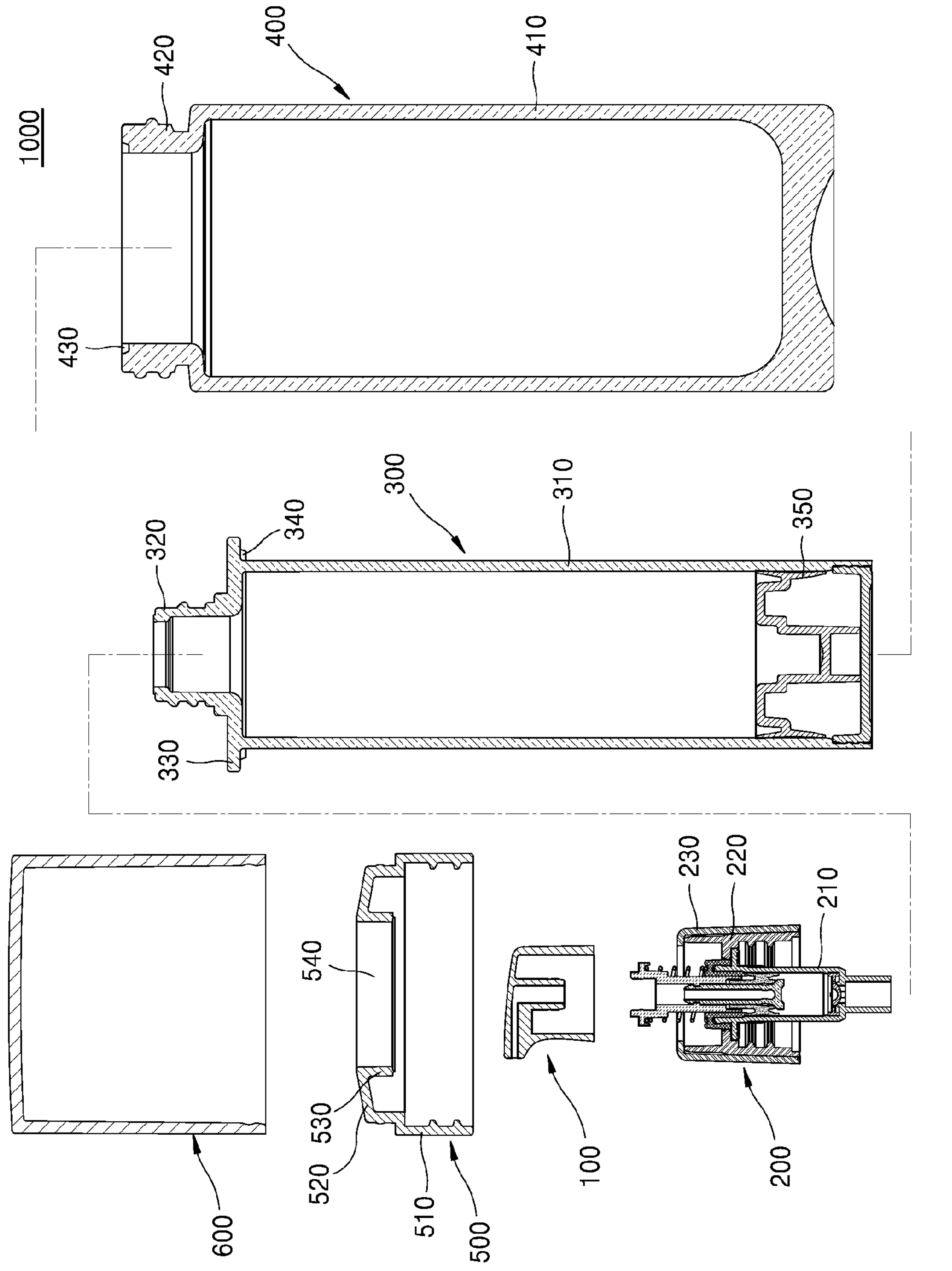
FIG. 2 is an exploded sectional view showing the double container according to the embodiment of the present invention.
Figure 3:
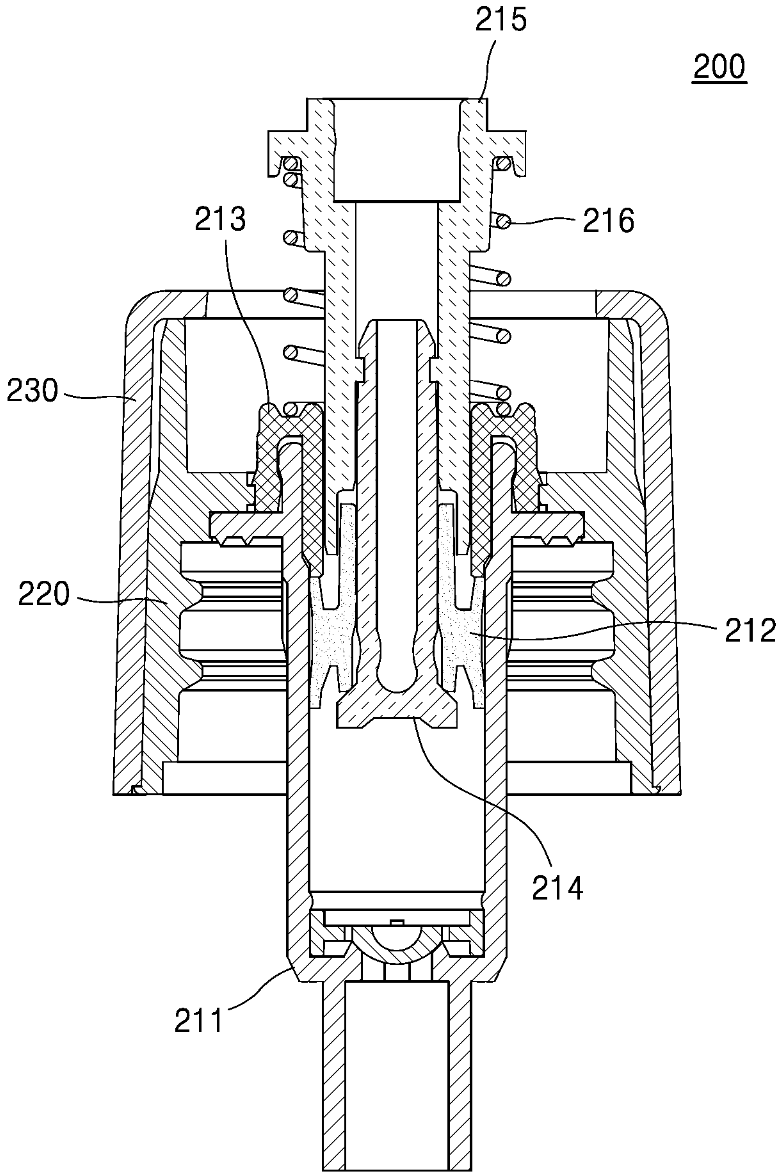
FIG. 3 is an enlarged sectional view showing a pump assembly of the double container according to the embodiment of the present invention.
Figure 4:
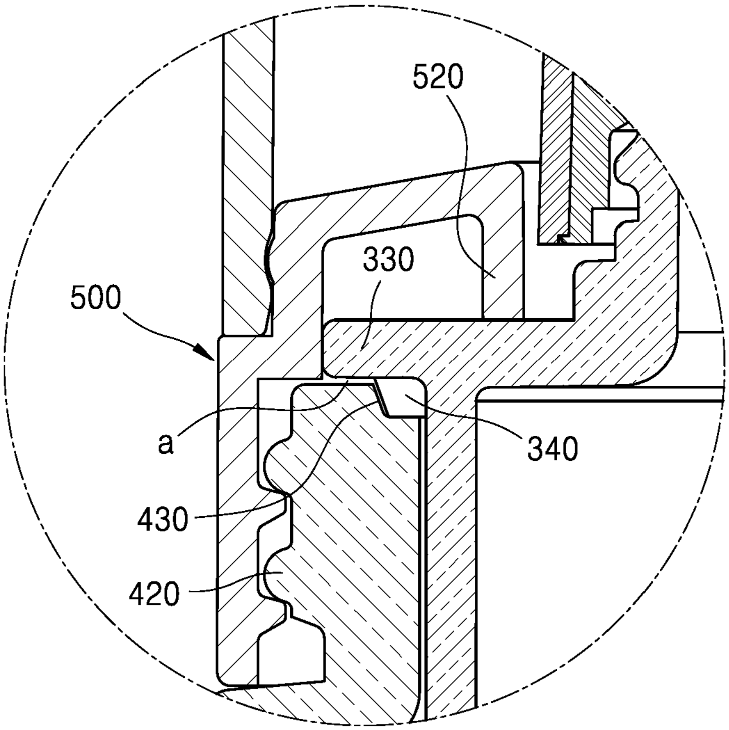
FIG. 4 is an enlarged sectional view showing a portion of the double container according to the embodiment of the present invention.

FIG. 1 is a sectional view showing a double container according to an embodiment of the present invention, FIG. 2 is an exploded sectional view showing the double container according to the embodiment of the present invention, FIG. 3 is an enlarged sectional view showing a pump assembly of the double container according to the embodiment of the present invention, and FIG. 4 is an enlarged sectional view showing a portion of the double container according to the embodiment of the present invention.

Referring to FIGS. 1 to 4, a double container 1000 according to an embodiment of the present invention includes a nozzle 100, a pump assembly 200, an inner container 300, an outer container 400, a shoulder 500, and a cap 600.

The nozzle 100 receives an external force applied from a user, transmits the external force to the pump assembly 200, and discharges a content discharged from the pump assembly 200 to the outside. In specific, the nozzle 100 includes a nozzle tip for receiving the external force applied from the user, a flow path formed inside the nozzle tip to allow the content to communicate with the pump assembly 200, and a discharge hole for discharging the content from the flow path to the outside. In this case, the content to be discharged to the outside is a fluid stored in the inner container 300, such as a cosmetic, a medicine, a quasi-drug like tooth paste, and the like, but the content may include all types of materials capable of being discharged by means of pumping.

The pump assembly 200 is configured to allow at least a portion to be seatedly accommodated in the inner container 300 (especially, a first edge portion 320), thereby sealing the inner container 300. As the nozzle 100 is pressurized, after that, the pump assembly 200 transfers the content stored in the inner container 300 to the nozzle 100. For example, the pump assembly 200 includes a pump 210, a screw cap 220, and a housing 230.

The pump 210 includes a cylinder 211 having an inlet communicating with the interior of a first accommodation portion of the inner container 300, a seal cap 212 disposed on the inner peripheral wall of the cylinder 211, a sealing member 213 coupled to the top end periphery of the cylinder 211 to suppress the seal cap 212 from moving up, a piston rod 214 having an inlet formed on one end thereof to be open and closed by means of the seal cap 212 and connected to the discharge hole of the nozzle 100, a stem 215 coupledly elevated unitarily with the piston rod 214 and fitted to the inside of the nozzle 100, and an elastic member 216 for providing an elastic force in a direction toward the nozzle 100 from the sealing member 213.

The cylinder 211 is coupled to an opening of the inner container 300 and has the inlet communicating with the inside of the inner container 300. In specific, the cylinder 211 is accommodated in the first edge portion 320 of the inner container 300, and in this case, the cylinder 211 has a wing portion formed outwardly from the upper peripheral surface thereof so that it can be seated onto the first edge portion 320. In this case, a soft sealing member is provided between the first edge portion 320 and the wing portion to prevent the content of the inner container 300 from leaking to the outside and to allow the cylinder 211 to be more firmly coupled to the inner container 300. The inlet of the cylinder 211 is formed on the center of the bottom of the pump 210 toward the inside of the inner container 300 and has a valve mounted thereon. The valve is a backflow prevention valve that is adapted to close the inlet of the cylinder 211 if the internal pressure of the cylinder 211 is positive and to be lifted upwardly to thus open the inlet of the cylinder 211 if the positive pressure of the cylinder 211 is changed into a negative pressure.

The seal cap 212 is disposed on the inner peripheral wall of the cylinder 211. The seal cap 212 is kept at a given position on the inner peripheral wall of the cylinder 211 by means of a frictional force, and if the external force does not exist, accordingly, the seal cap 212 moves up and down, together with the cylinder 211. The seal cap 212 has an H-shaped crossing section and is configured to allow two or more points of the outer peripheral surface thereof to come into contact with the inner peripheral wall of the cylinder 211, thereby ensuring the frictional force sufficiently. Further, the inner peripheral surface of the seal cap 212 comes into contact with the piston rod 214, and in this case, the shape of the seal cap 212 is determined appropriately so that the frictional force applied to the outer peripheral surface of the seal cap 212 is greater than the frictional force applied to the inner peripheral surface of the seal cap 212. The seal cap 212 opens and closes the inlet of the piston rod 214. In specific, the inner lower end of the seal cap 212 comes into close contact with the base of the piston rod 214 to seal the inlet of the piston rod 214, and if the seal cap 212 moves up with respect to the piston rod 214, further, a space between the inner lower end of the seal cap 212 and the base of the piston rod 214 is opened to allow the inlet of the piston rod 214 to communicate with the inside of the cylinder 211.

The sealing member 213 is coupled to the top end periphery of the cylinder 211 and extended inwardly from the bottom end thereof toward the inside of the cylinder 211 to suppress the seal cap 212 from moving up. A gap may be formed between the inner peripheral surface of the sealing member 213 and the stem 215 as will be discussed later so as to permit the movement of the sealing member 213 with respect to the stem 215. Of course, in this case, a separate sealing member may be disposed in the gap between the sealing member 213 and the stem 215 to prevent the fluid from leaking to the gap.

The piston rod 214 has the inlet formed on the outer surface of the bottom thereof to be open and closed by means of the seal cap 212 and is connected to the discharge hole of the nozzle 100. The lower peripheral surface of the piston rod 214 is surrounded with the inner peripheral surface of the seal cap 212 and the upper peripheral surface thereof is connected to the inside of the nozzle 100 through the stem 215. The piston rod 214 moves up and down relative to the cylinder 211. The piston rod 214 has the base disposed on the bottom thereof. The base has a conical shape, and if the inner lower end of the seal cap 212 comes into close contact with the base of the piston rod 214, the inlet of the piston rod 214 is isolated from the inner space of the cylinder 211. Contrarily, if the seal cap 212 moves up with respect to the base, the inner lower end of the seal cap 212 is isolated from the base of the piston rod 214, the inlet of the piston rod 214 is opened to thus communicate with the inner space of the cylinder 211 so that the content inside the cylinder 211 may be introduced into the piston rod 214.

The piston rod 214 has the shape of a hollow pipe so that the bottom communicates with the inlet and the top communicates with the outlet through the interior of the stem 215. Accordingly, the content is introduced into the piston rod 214 through the inlet opened by the seal cap 212 and then discharged from the nozzle 100 through the stem 215.

The stem 215 is configured to allow the lower end periphery to be coupled unitarily with the piston rod 214 and the upper end periphery to be coupled to the lower end periphery of the nozzle 100. According to the present invention, the stem 215 and the piston rod 214 are provided separately from each other, but of course, they may be made as a unitary body. The stem 215 has a wing portion protruding outwardly from the outer peripheral surface of the upper end thereof.

The elastic member 216 is disposed between the stem 215 and the sealing member 213. In specific, top of the elastic member 216 comes into close contact with the underside of the wing portion of the stem 215 and bottom comes into close contact with top of the sealing member 213, thereby applying an elastic force in an upward direction with respect to the stem 215. That is, if the nozzle 100 is pressurized by the user to cause the nozzle 100 and the stem 215 to move down, the elastic member 216 provides the elastic force to allow the nozzle 100 and the stem 215 to return to their original position. For example, a spring is provided as the elastic member 216, but without being limited thereto, various elastic materials may be provided according to embodiments of the present invention.

The screw cap 220 is coupled to the outer peripheral surface of the pump 210 and has a screw thread formed on the inner peripheral wall thereof to interlock with a screw thread formed on the first edge portion 320 of the inner container 300, so that the screw cap 220 is coupled to the inner container 300. Upon the coupling, further, a pressurizing portion protruding inwardly from the inner peripheral surface of the screw cap 220 downwardly pressurizes the wing portion of the cylinder 211 disposed on top of the first edge portion 320 of the inner container 300, so that the pump assembly 200 is more stably coupled to the inner container 300 and the air tightness between the inner container 300 and the pump assembly 200 is more firmly obtained.

The housing 230 serves to accommodate the above-mentioned components of the pump assembly 200 therein to protect them from the outside.

The containers 300 and 400 are the inner container 300 and the outer container 400 constituting the double container 1000. The inner container 300 has the content stored therein and interlocks with the pump assembly 200 to apply the content to the outside of the double container 1000, and the outer container 400 accommodates the inner container 300 therein.

The inner container 300 includes a first accommodation portion 310 and the first edge portion 320. The first accommodation portion 310 provides a storage space for the content, and as shown, it has a long cylindrical shape. However, it may not be limited thereto. Further, top of the first accommodation portion 310 is opened to allow the content to communicate with the pump assembly 200. The first edge portion 320 extends upwardly from top of the first accommodation portion 310 and has a smaller inner diameter than the first accommodation portion 310. Top of the first edge portion 320 is opened, and it is closed when coupled to the pump assembly 200. The screw cap 220 of the pump assembly 200 is coupled to the outer peripheral surface of the first edge portion 320, and the cylinder 211 of the pump assembly 200 is accommodated in the inside of the first edge portion 320.

Further, the inner container 300 has a seating edge portion 330 protruding outwardly from the outer peripheral surface of top of the first accommodation portion 310. The seating edge portion 330 serves to allow the inner container 300 to be more stably seated onto the outer container 400, which will be discussed in detail below.

Further, the inner container 300 has a disc 350 disposed inside the first accommodation portion 310 so that as the content is discharged, the disc 350 moves up. The disc 350 serves to push the content upwardly as the content stored in the first accommodation portion 310 becomes consumed, and in specific, the disc 350 is kept to come into close contact with the inner peripheral wall of the first accommodation portion 310 so that as the content is discharged to decrease in volume in the first accommodation portion 310, the disc 350 moves up.

To allow the disc 350 to move up gently, given air inlet holes (not shown) are formed on the underside of the first accommodation portion 310. If the disc 350 moves up by an amount of the content discharged, air is introduced into the first accommodation portion 310 through the air inlet holes. Like this, the content of the first accommodation portion 310 is stored in the state of being blocked from external air by means of the disc 350, and in this case, the pump assembly 200 of the present invention is an airless pump.

Like the inner container 300, the outer container 400 includes a second accommodation portion 410 and a second edge portion 420. The second accommodation portion 410 provides an accommodation space for locating the inner container 300 therein and has a cylindrical shape corresponding to the first accommodation PORTION 310. Otherwise, the second accommodation portion 410 may be more curvedly formed than the first accommodation portion 310 so that it has a volume extending outwardly. However, the outer container 400 may not be limited thereto in shape.

According to the embedment of the present invention, the outer container 400 is made of glass or ceramic. According to the present invention, the outer container 400 is made of glass so that it can provide more luxurious appearance than the existing container made of a synthetic resin, and the like, and if the outer container 400 has given transparency, the design of the inner container 300 is projected onto the outer container 400, thereby upgrading the outer appearance of the double container 1000.

According to the present invention, also, the outer container 400 is made by means of blow molding. According to the blow molding, a given tube is pre-molded by means of extrusion or injection, and after the tube is fitted to a mold, air blows into the mold to inflate the tube and harden the tube with cool air, thereby providing a solid object with a given shape. According to the present invention, the outer container 400 is made by means of the blow molding, and accordingly, different designs and outer appearances that are not found in the existing containers made by means of the injection molding can be provided for the double container according to the present invention.

The outer container 400 is configured to allow top of the second accommodation portion 410 to be opened to thus accommodate the inner container 300 therein, and the second edge portion 420 extends upwardly from the open top. The shoulder 500 is coupled to the outer peripheral surface of the second edge portion 420, and the inner container 300 is seated onto top of the second edge portion 420. That is, when the inner container 300 is inserted into the outer container 400, the seating edge portion 330 (and/or rotation prevention protrusions 340) of the inner container 300 is locked onto top of the second edge portion 420, so that the accommodated depth of the inner container 300 is limited and the inner container 300 is stably coupled to the outer container 400.

According to the present invention, the inner container 300 has the at least one or more rotation prevention protrusions 340 formed downwardly from the underside of the seating edge portion 330, and the outer container 400 has at least one or more rotation prevention grooves 430 formed on the inner peripheral surface of the second edge portion 420 to correspond to the rotation prevention protrusions 340. When the inner container 300 is coupled to the outer container 400, the rotation prevention protrusions 340 are insertedly fitted to the rotation prevention grooves 430 of the outer container 400, so that the inner container 300 can be prevented from rotating. However, they are just exemplary, and therefore, various structures for preventing rotation between the inner container 300 and the outer container 400 may be provided. For example, the rotation prevention grooves may be formed on the seating edge portion 330 of the inner container 300, and the rotation prevention protrusions may be formed on the inner peripheral surface of the second edge portion 420 of the outer container 400 to correspond to the rotation prevention grooves.

According to the embedment of the present invention, the rotation prevention grooves 430 are slant on at least one side thereof. For example, the rotation prevention grooves 430 are slant on the opposite side to the inner container 300. As at least one side of the rotation prevention grooves 430 is slant and the rotation prevention protrusions 340 have the corresponding shapes to the rotation prevention grooves 430 slant on one side thereof, contact areas between the rotation prevention protrusions 340 and the rotation prevention grooves 430 become increased to allow the inner container 300 and the outer container 400 to be more stably coupled to each other.

Figure 5:
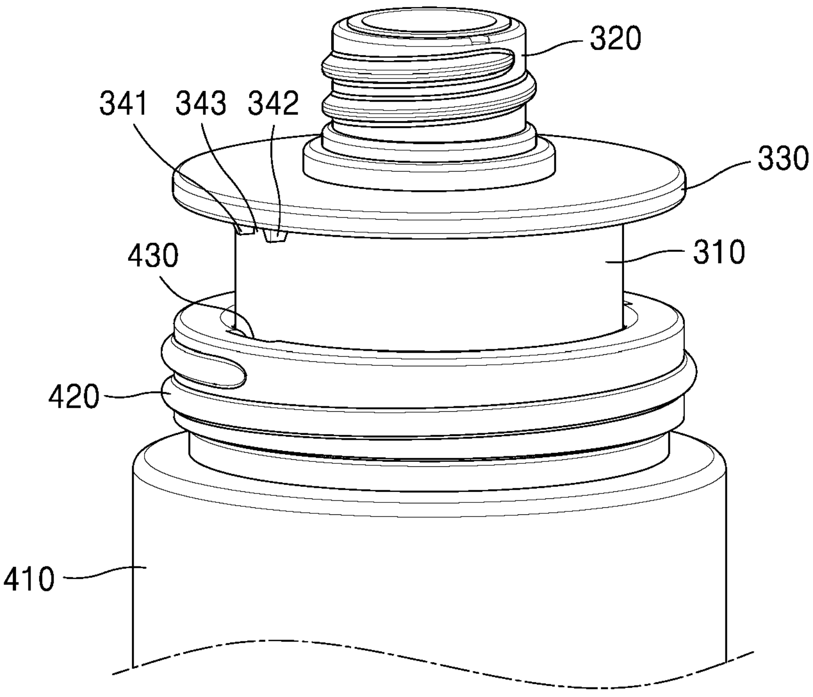
FIGS. 5 and 6 are perspective views showing an outer container and an inner container of the double container according to the embodiment of the present invention.

According to the embodiment of the present invention, further, a protruding height of each rotation prevention protrusion 340 is greater than a depth of the corresponding rotation prevention groove 430. When the inner container 300 is coupled to the outer container 400, accordingly, at least a portion of the underside of the seating edge portion 330 (for example, the underside of the seating edge portion 330 excepting the area where the rotation prevention protrusions 340 are formed) is spaced apart from top of the second edge portion 420 of the outer container 400 by a given distance, and through the space, a first communication portion a for air communication with the second accommodation portion 410 is formed. For example, as shown in FIGS. 4 and 5, the first communication portion a is connected to second communication portions b formed inside the rotation prevention grooves 430, thereby allowing the second accommodation portion 410 to communicate with external air.

The shoulder 500 serves to couple the outer container 400 and the inner container 300 to each other more stably, and in specific, the shoulder 500 is detachably coupled to the second edge portion 420, so that through the coupling, the shoulder 500 pressurizes the inner container 300 to allow the inner container 300 to come into close contact with the outer container 400 so that the inner container 300 is fixed to the outer container 400. According to the present invention, that is, if the inner container 300 is seated onto the outer container 400, first coupling between the seating edge portion 330 and the rotation prevention protrusions 340 of the inner container 300 and the second edge portion 420 and the rotation prevention grooves 430 of the outer container 400 is preformed, and next, second coupling between the inner container 300 and the outer container 400 is performed through the shoulder 500, thereby providing a more firm double coupling structure.

The shoulder 500 includes a side peripheral wall 510 coupled to the outer peripheral surface of the second edge portion 420 of the outer container 400, a top wall 520 bent inwardly from the top end periphery of the side peripheral wall 510, and a pressurizing edge 530 extending downwardly from the inner end periphery of the top wall 520 to downwardly pressurize the inner container 300. That is, the shoulder 500 is coupled to the outer container 400 by means of the side peripheral wall 510, and through the coupling, the pressurizing edge 530 moves down to pressurize the inner container 300 downwardly, so that the inner container 300 comes into close contact with the outer container 400. According to the embodiment of the present invention, the shoulder 500 may be coupled to the second edge portion 420 of the outer container 400 by means of screw coupling, fitting coupling, and the like, and to do this, the inner peripheral wall of the shoulder 500 and the outer peripheral wall of the second edge portion 420 may have protrusions, screw threads, and the like. According to the embodiment of the present invention, further, the pressurizing edge 530 may have at least one pressurizing protrusion formed from the bottom thereof.

Further, the shoulder 500 includes a through hole 540 formed inside the pressurizing edge 530 to allow the pump assembly 200 to pass therethrough, and the inner peripheral surface of the pressurizing edge 530 comes into close contact with the outer peripheral surface of the pump assembly 200 to support the outer peripheral surface of the pump assembly 200.

Figure 7:
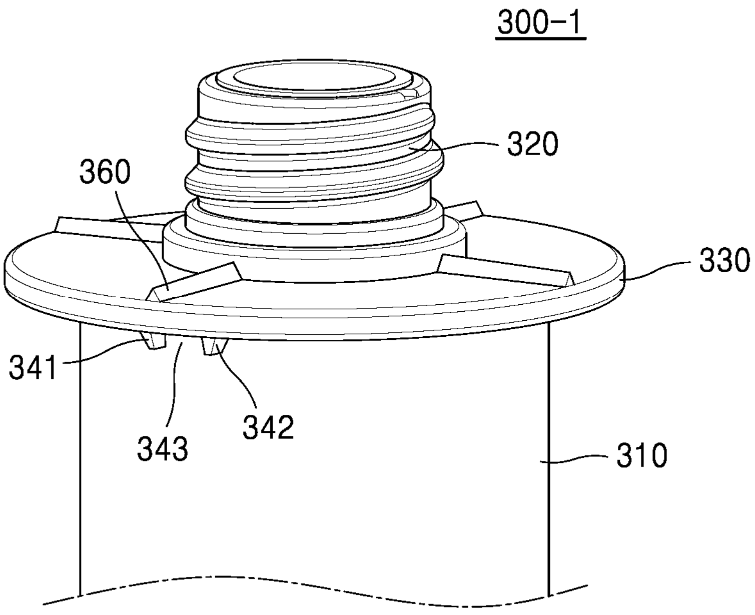
FIG. 7 is a perspective view showing another example of the inner container of the double container according to the embodiment of the present invention.

According to the embodiment of the present invention, the shoulder 500 is separable from the outer container 400 alone or together with the cap 600 in a state where the inner container 300, the pump assembly 200, and the nozzle 100 are coupled to the outer container 400. Further, if the shoulder 500 is separated, the inner container 300, the pump assembly 200, and the nozzle 100, which are coupled to one another, are unitarily separable from the outer container 400. As a result, as shown in FIG. 7, the double container 1000 of the present invention may be more easily refilled with a new content.

The cap 600 serves to cover the nozzle 100 to prevent an accidental external force from being applied to the nozzle 100 and to protect the nozzle 100 from contamination. The cap 600 is detachably coupled to the outer peripheral surface of the shoulder 500 or the pump assembly 200 and separable therefrom by means of the user. If the cap 600 is coupled to the shoulder 500, the cap 600 and the shoulder 500 are unitarily separable from the outer container 400. To improve the coupling force of the cap 600, a stepped projection (having no reference numeral) and a locking projection (having no reference numeral) are formed on the inner peripheral surface of the cap 600 and the outer peripheral surface of the shoulder 500 or the pump assembly 200. However, they are just exemplary, and therefore, various structures may be provided to perform the detachable coupling of the cap 600.

Even though not shown in FIGS. 1 to 4, a buffer may be disposed between the shoulder 500 and the inner container 300 of the double container 1000 according to the present invention. The buffer serves to transfer the pressurizing force of the shoulder 500 to the inner container 300. As mentioned above, the shoulder 500 pressurizes the inner container 300 downwardly as it is coupled to the outer container 400, but it is hard for the shoulder 500 to appropriately pressurize the inner container 300 according to the coupled state or degree with the outer container 400. For example, even though coupling between the shoulder 500 and the outer container 400 is completely achieved, the pressurizing edge 530 of the shoulder 500 may not come into contact with top of the first accommodation portion 310, and otherwise, before the shoulder 500 and the outer container 400 are completely coupled to each other, the pressurizing edge 530 of the shoulder 500 comes into contact with top of the first accommodation portion 310, thereby causing the coupling between the shoulder 500 and the outer container 400 to be weakened. To solve such problems, the buffer is disposed on top of the inner container 300 and the underside of the pressurizing edge 530 of the shoulder 500, and further, the buffer is made of a soft material such as rubber, silicone, and the like to thus extend the length of the pressurizing edge 530 toward the inner container 300. If an excessive pressure is applied from the pressurizing edge 530, the buffer may reduce the pressure to allow the inner container 300 to come into close contact with the outer container 400 at an appropriate degree.

Figure 6:
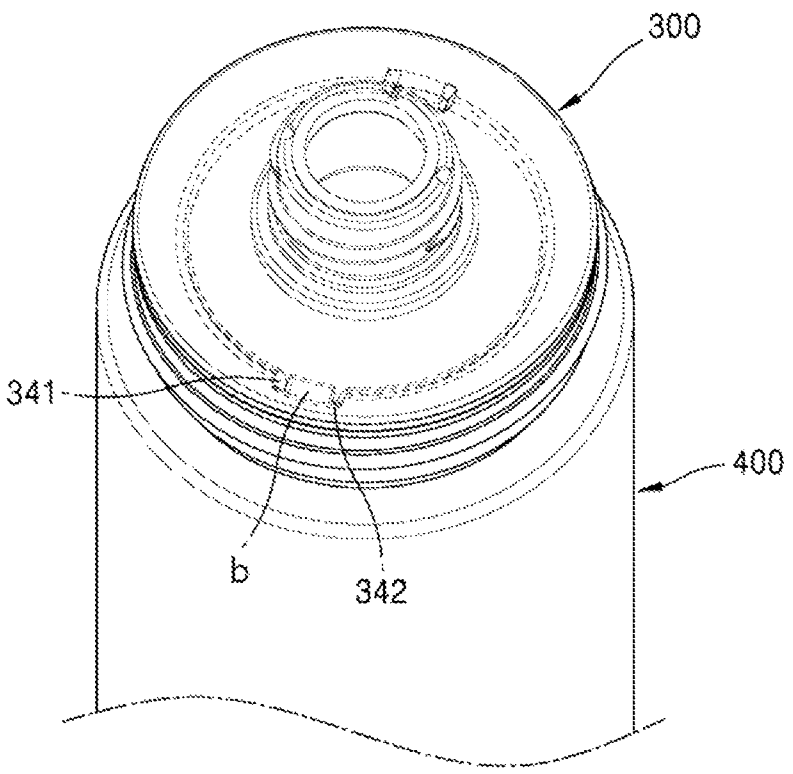

FIGS. 5 and 6 show the outer container and the inner container of the double container according to the embodiment of the present invention.

Referring to FIGS. 5 and 6, a plurality of rotation prevention protrusions 341 and 342 are insertedly fitted to one or more rotation prevention grooves 430 formed on the outer container 400. In this case, at least portions of the plurality of rotation prevention protrusions 341 and 342 inserted into the corresponding rotation prevention grooves 430 are spaced apart from each other to thus form given isolation spaces 343, and through the isolation spaces 343, the second communication portions b are formed inside the rotation prevention grooves 430.

For example, as shown, the two rotation prevention protrusions, that is, the first rotation prevention protrusion 341 and the second rotation prevention protrusion 342 are inserted into the respective rotation prevention grooves 430, respectively, and the first rotation prevention protrusion 341 and the second rotation prevention protrusion 342 are spaced apart from each other to thus form the isolation space 343 therebetween. If the inner container 300 is coupled to the outer container 400, the first rotation prevention protrusion 341 and the second rotation prevention protrusion 342 are located on both side ends of the corresponding rotation prevention groove 430 to prevent the inner container 300 from rotating with respect to the outer container 400, and further, the isolation space 343 between the first rotation prevention protrusion 341 and the second rotation prevention protrusion 342 serves as the corresponding second communication portion b for air communication with the second accommodation portion 410.

Further, as mentioned above, the protruding heights of the first rotation prevention protrusion 341 and the second rotation prevention protrusion 342 are greater than the depths of the rotation prevention grooves 430, so that the first communication portion a is formed between the underside of the seating edge portion 330 of the inner container 300 and the top of the second edge portion 420 of the outer container 400, and the second communication portions b connected to the first communication portion a by means of the isolation spaces 343 are formed. Through the first communication portion a and the second communication portions b, the second accommodation portion 410 of the outer container 400 communicates with external air.

Accordingly, if the inner container 300 of the double container 1000 according to the present invention is an airless type container, the first accommodation portion 310 is contracted or the disc 350 moves up gently in accordance with the discharge of the content, so that the content can be all consumed, without having any malfunction of the pump.

FIG. 7 shows another example of the inner container of the double container according to the embodiment of the present invention.

The same parts as shown in FIGS. 1, 2, 4 to 7 are indicated by the same terms and reference numerals, and so as to avoid repeated explanations, the inner container as will be discussed below will be explained with reference to FIGS. 1, 2, 4 to 6. Hereinafter, only differences between the two embodiments of the present invention will be described.

Referring to FIG. 7, an inner container 300-1 according to the embodiment of the present invention has at least one or more ribs 360 protruding from top of the first accommodation portion 310 and/or the seating edge portion 330. For example, the plurality of ribs 360 extend outwardly from the first edge portion 320 at different angles from each other so that they are arranged radially. Further, for example, the respective ribs 360 extend from the first edge portion 320 toward the outer periphery of the seating edge portion 330 and become gradually thinner at upper ends thereof so that their top becomes tapered.

When the shoulder 500 is coupled to the inner container 300-1, the ribs 360 serve to allow top of the inner container 300-1 to be uniformly pressurized by means of the pressurizing edge 530 and/or the buffer of the shoulder 500.

Figure 8:
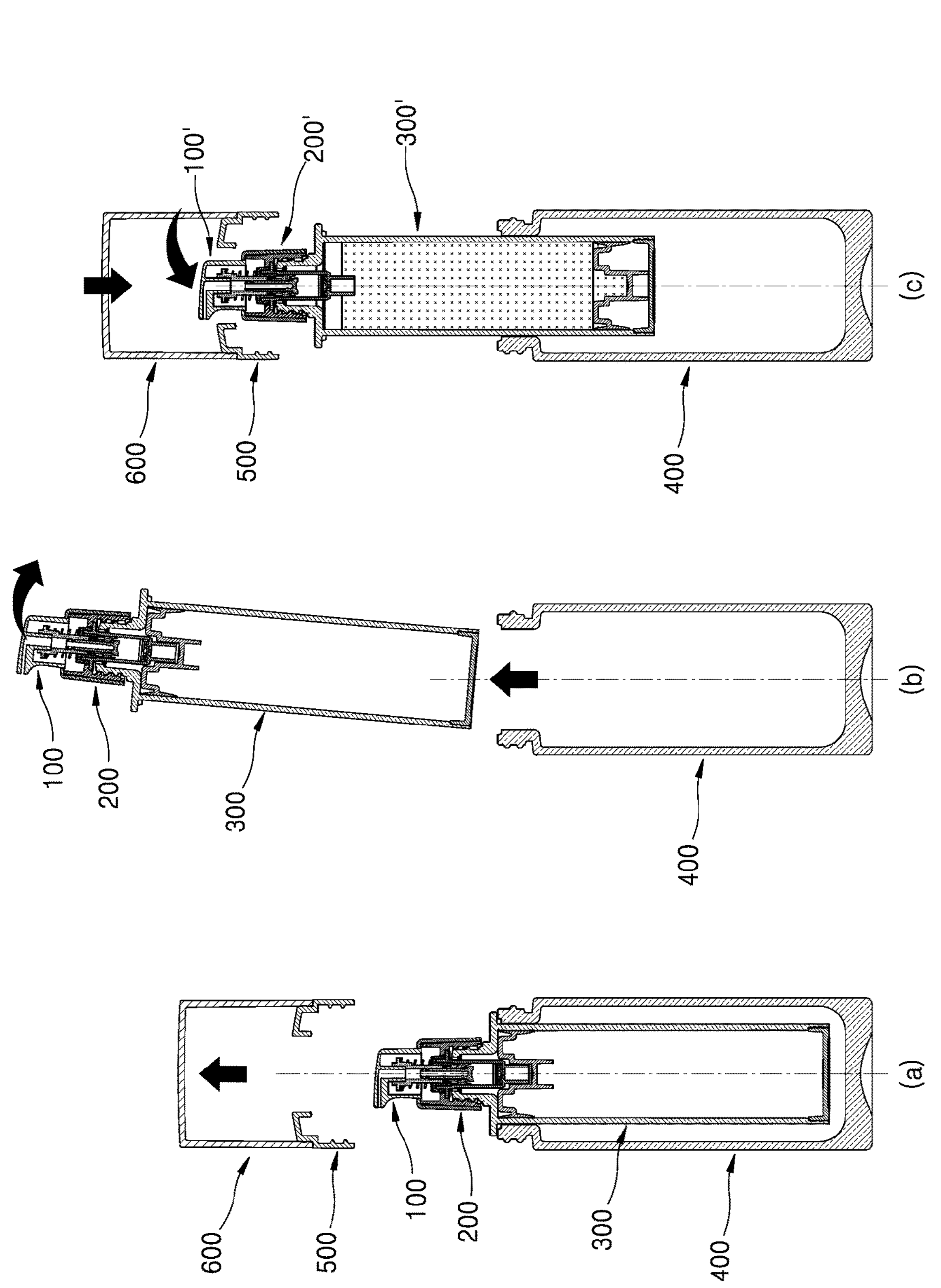
FIG. 8 is a sectional view showing the example of use of the double container according to the embodiment of the present invention.

FIG. 8 shows the example of use of the double container according to the embodiment of present invention.

Referring to FIG. 8, if the content stored in the double container 1000 of the present invention is all consumed, the inner container 300, the pump assembly 200, and the nozzle 100 are unitarily exchanged with new ones by the user, and accordingly, the double container 1000 can be refilled with a new content.

First, the screw coupling between the shoulder 500 and the second edge portion 420 is first released by the user to thus separate both of the shoulder 500 and the cap 600 from the double container 1000. Accordingly, the fixed state of the inner container 300 is released. In this case, the shoulder 500 is separated alone or together with the cap 600 by means of the through hole 540 in the state where the inner container 300, the pump assembly 200, and the nozzle 100 are coupled to the outer container 400.

Next, the inner container 300 is removed from the outer container 400, together with the pump assembly 200 and the nozzle 100.

After that, a new inner container 300' to which a pump assembly 200' and a nozzle 100' are coupled is inserted into the second accommodation portion 410 of the outer container 400, and the shoulder 500 and the cap 600 are coupled to the inner container 300' to pressurizingly fix the inner container 300' thereto, so that the double container 1000 can be refilled with the new content.

On the other hand, the shoulder 500 and the cap 600 are unitarily separated and/or coupled from and to the outer container 400, but they are not limited thereto. In specific, the cap 600 is first separated from the shoulder 500, and next, the shoulder 500 is separated from the outer container 400. Otherwise, the shoulder 500 is first coupled to the outer container 400, and next, the cap 600 is coupled to the shoulder 500.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. It should be therefore understood that the embodiments of the present invention are just exemplary embodiments, while not limiting the present invention. Persons skilled in the relevant art can appreciate that many modifications and variations are possible in light of the above teachings. It is therefore intended that the scope of the invention be limited not by this detailed description, but rather by the claims appended hereto.

The invention claimed is:

1. A double container comprising:

a nozzle for discharging a content through a discharge hole under pressurization of a user;

a pump assembly for discharging the content under the pressurization of the nozzle;

an inner container comprising: a first accommodation portion accommodating the content therein; a first edge portion disposed on a top of the first accommodation portion to accommodatedly seat at least a portion of the pump assembly thereonto; and a seating edge portion protruding outwardly from an outer peripheral surface of the top of the first accommodation portion;

an outer container comprising a second accommodation portion accommodating the inner container therein and a second edge portion disposed on a top of the second accommodation portion;

a shoulder detachably coupled to the second edge portion of the outer container and pressurizing the inner container through the coupling to the outer container to allow the inner container to come into close contact with the outer container; and a cap detachably coupled to the shoulder and covering at least a portion of the nozzle and the pump assembly thereinto when coupled to the shoulder, wherein when the shoulder is coupled to the second edge portion of the outer container, the seating edge portion is seated onto a top of the second edge portion of the outer container, wherein the shoulder and the cap are unitarily separable from the outer container, and wherein the nozzle, the pump assembly, and the inner container are unitarily separable from the outer container when the shoulder is in a detached state from the second edge portion of the outer container.

2. The double container according to claim 1, wherein the shoulder comprises:

a side peripheral wall coupled to an outer peripheral surface of the second edge portion of the outer container;

a top wall bent inwardly from a top end periphery of the side peripheral wall; and a pressurizing edge extending downwardly from an inner end periphery of the top wall to downwardly pressurize the inner container.

3. The double container according to claim 2, wherein the pressurizing edge has a through hole disposed at an inside thereof to pass the pump assembly therethrough, and an inner peripheral surface of the pressurizing edge comes into close contact with an outer peripheral surface of the pump assembly.

4. The double container according to claim 1, wherein the seating edge portion has one or more rotation prevention protrusions protruding from an underside thereof, the second edge portion of the outer container has one or more rotation prevention grooves disposed on an inner peripheral surface thereof to insert the one or more rotation prevention protrusions thereinto, and the inner container is prevented from rotating by insertion of the rotation prevention protrusions into corresponding rotation prevention grooves.

5. The double container according to claim 4, wherein protruding heights of the one or more rotation prevention protrusions are greater than depths of the one or more rotation prevention grooves, at least a portion of the underside of the seating edge portion is spaced apart from the top of the second edge portion by a given distance, and through the space, a first communication portion for air communication with the second accommodation portion is formed.

6. The double container according to claim 4, wherein more than one rotation prevention protrusions are inserted into the one or more rotation prevention grooves, respectively, at least portions of the more than one rotation prevention protrusions inserted into the corresponding rotation prevention grooves are spaced apart from each other, and through the space between the more than one rotation prevention grooves, a second communication portion for air communication with the second accommodation portion is formed.

7. The double container according to claim 1, wherein the inner container has a disc disposed inside the first accommodation portion, and when the content is discharged, the disc moves up.

* * * * *